(12) United States Patent
Harada (10) Patent No.: US 11,556,622 B2
(45) Date of Patent: Jan. 17, 2023

(54) IMAGE PROCESSING APPARATUS AND NON-TRANSITORY COMPUTER READABLE MEDIUM FOR HANDLING DIFFERENT KINDS OF PROCESSES

(71) Applicant: FUJIFILM BUSINESS INNOVATION CORP., Tokyo (JP)

(72) Inventor: Masahiko Harada, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 441 days.

(21) Appl. No.: 16/577,190

(22) Filed: Sep. 20, 2019

(65) Prior Publication Data
US 2020/0327210 A1   Oct. 15, 2020

(30) Foreign Application Priority Data

Apr. 12, 2019 (JP) .............................. JP2019-076087

(51) Int. Cl.
*G06F 21/31* (2013.01)
*G06F 21/60* (2013.01)
*H04N 1/00* (2006.01)

(52) U.S. Cl.
CPC ............ *G06F 21/31* (2013.01); *G06F 21/608* (2013.01); *H04N 1/00838* (2013.01)

(58) Field of Classification Search
CPC .................................................. G06F 21/31
USPC ....................................................... 358/1.15
See application file for complete search history.

(56) References Cited

U.S. PATENT DOCUMENTS

2015/0205551 A1* 7/2015 Dohi .................. H05K 999/00
                                                      358/1.15
2018/0234585 A1* 8/2018 Yano ..................... G06F 21/34

FOREIGN PATENT DOCUMENTS

| JP | 2002-101239 A | 4/2002 |
|---|---|---|
| JP | 2005-57491 A | 3/2005 |
| JP | 2006-191182 A | 7/2006 |
| JP | 2017-38399 A | 2/2017 |
| JP | 2017-94507 A | 6/2017 |
| JP | 2017-98916 A | 6/2017 |

OTHER PUBLICATIONS

Oct. 18, 2022 Office Action issued in Japanese Patent Application No. 2019-076087.

* cited by examiner

*Primary Examiner* — Jacky X Zheng
(74) *Attorney, Agent, or Firm* — Oliff PLC (57) ABSTRACT

An image processing apparatus includes an authenticating unit, a first communication interface, a second communication interface, an image forming unit, and a managing unit. The first communication interface is disposed for communication with an external apparatus, the second communication interface differs from the first communication interface and can connect to an external apparatus if a predetermined requirement for operation is satisfied. The image forming unit forms an image on a medium in accordance with an execution instruction received from an external apparatus via the first communication interface or the second communication interface. The managing unit handles one process performed by the image forming unit separately from the image forming unit.

11 Claims, 6 Drawing Sheets

IMAGE PROCESSING APPARATUS AND NON-TRANSITORY COMPUTER READABLE MEDIUM FOR HANDLING DIFFERENT KINDS OF PROCESSES

CROSS-REFERENCE TO RELATED APPLICATIONS

This application is based on and claims priority under 35 USC 119 from Japanese Patent Application No. 2019-076087 filed Apr. 12, 2019.

BACKGROUND

(i) Technical Field

The present disclosure relates to an image processing apparatus and a non-transitory computer readable medium.

(ii) Related Art

An organization, such as an enterprise, adopts a principle of restricting use of an image processing apparatus belonging to the organization to purposes relating to business operations performed by people affiliated with the organization. In contrast, such an organization sometimes adopts a practice of allowing personal use of the image processing apparatus on condition that a requirement, such as charging, is satisfied. A technique to control charging in accordance with a method of inputting an image into an image processing apparatus is known in the art.

Japanese Unexamined Patent Application Publication No. 2002-101239 discloses an image information output system that includes a first image information input unit, a second image information input unit, an image information output unit, and a charging management unit. The first image information input unit receives image information, and the second image information input unit receives image information from external apparatuses via an interface. The image information output unit outputs image information received by the first or second image information input unit. The charging management unit manages fees charged for image information that is received by the first image information input unit and that is output from the image information output unit. The charging management unit does not charge fees for image information that is received by the second image information input unit and that is output from the image information output unit.

SUMMARY

When an image processing apparatus belonging to an organization is used and a distinction is made between use for business operations by a person affiliated with the organization and personal use by a plurality of users, individual management of each user who uses the image processing apparatus is necessary in addition to identifying the purpose of the use. However, it is cumbersome to register users in advance for allowing personal use. If an image processing apparatus is connected to external apparatuses by different connection methods in accordance with purposes of the use, upon receiving an execution instruction from such an external apparatus, the image processing apparatus recognizes the method of connection between the external apparatus and the image processing apparatus and can identify the purpose of the use of the image processing apparatus.

Aspects of non-limiting embodiments of the present disclosure relate to providing an image processing apparatus that belongs to an organization and that, when in use, classifies information relating to the use of the image processing apparatus in accordance with a method of connection between an external apparatus sending an execution instruction and the image processing apparatus. The image processing apparatus is capable of individual management of each user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including
an authenticating unit that authenticates a user,
a first communication interface for communication with an external apparatus,
a second communication interface that differs from the first communication interface and that can connect to an external apparatus if a predetermine requirement for operation is satisfied,
an image forming unit that forms an image on a medium in accordance with an execution instruction received from an external apparatus via the first communication interface or the second communication interface, and
a managing unit that handles one kind of process performed by the image forming unit separately from the other kind of process performed by the image forming unit, the one kind of process being performed by the image forming unit in accordance with an execution instruction received from an external apparatus via the second communication interface, the execution instruction being received after a predetermined requirement for use satisfied, and that manages, for the one kind of process, information relating to a user authentication result obtained by the authenticating unit and information relating to a process performed in accordance with the execution instruction.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the attached drawings.

System Configuration

Figure 1:
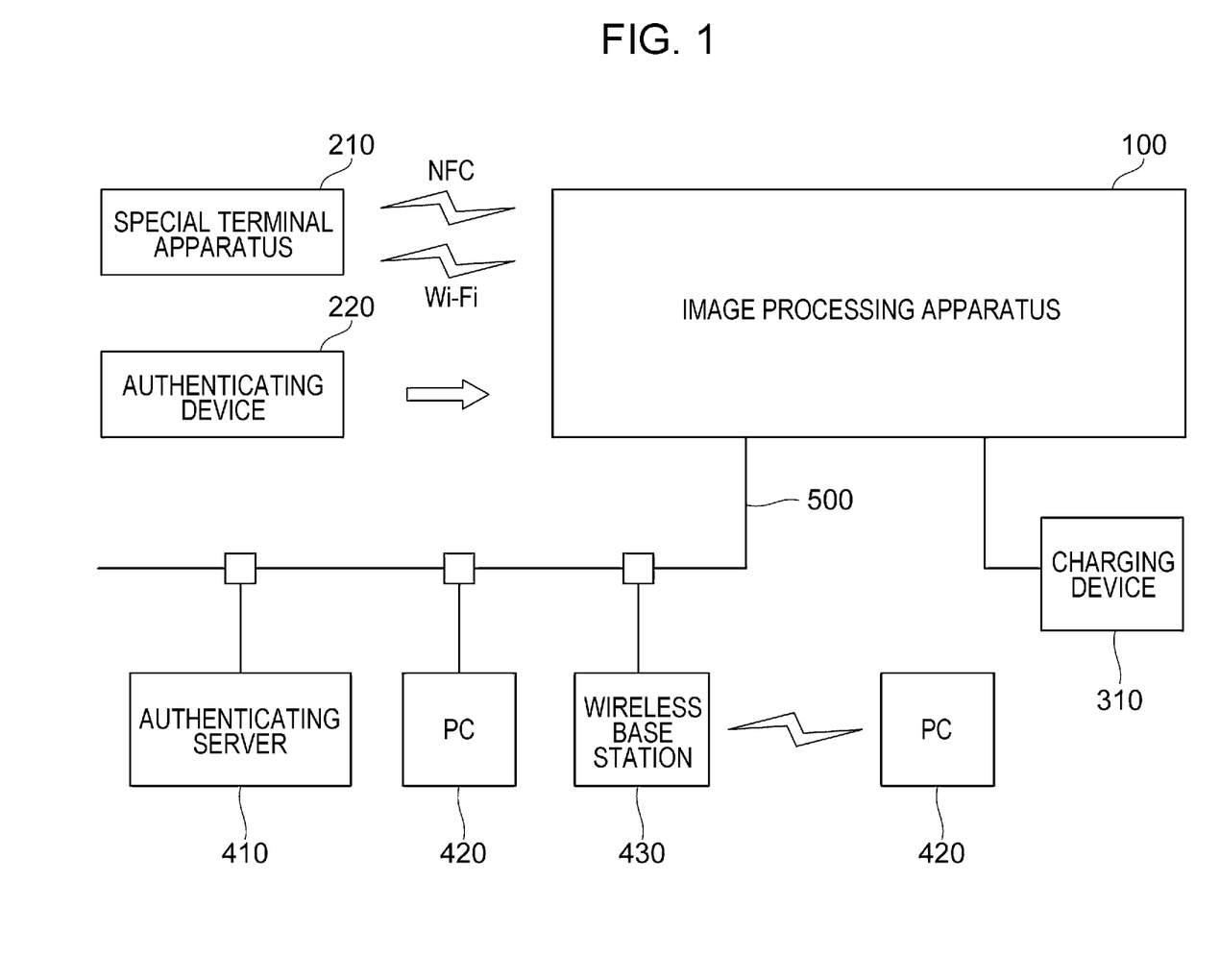
FIG. 1 is an illustration depicting an overall configuration of an information processing system to which the present exemplary embodiment is applied.

FIG. 1 is an illustration depicting an overall configuration of an information processing system to which the present exemplary embodiment is applied. A system according to the present exemplary embodiment is constituted by an image processing apparatus 100 and various devices that can be connected to the image processing apparatus 100 by using individual connection units. In the system configuration depicted in FIG. 1, a special terminal apparatus 210, an authenticating device 220, a charging device 310, an authenticating server 410, a personal computer (PC) 420, and a wireless base station 430 are connected.

In the system depicted in FIG. 1, the image processing apparatus 100 and the special terminal apparatus 210 are connected to each other, for example, via wireless communication such as Wi-Fi communication. The image processing apparatus 100 and the authenticating device 220 are connected to each other, for example, via short-range wireless communication such as near field communication (NFC). The image processing apparatus 100 and the charging device 310 are connected to each other, for example, via a dedicated communication line. The image processing apparatus 100 is connected to the authenticating server 410, the personal computer 420, and the wireless base station 430, for example, via a wired network 500 such as a wired local area network (LAN).

In the present exemplary embodiment, the image processing apparatus 100 is provided as a resource of an organization to which a user belongs. Here, examples of an organization include an enterprise and a group, and a user is a member of such an organization. As a general rule, the use of the image processing apparatus 100 by such a user is classified as the use by an organization. However, if a specific requirement is satisfied in the operation of the image processing apparatus 100, the use of the image processing apparatus 100 by such a user is treated as the use by an individual (personal use), which is separate from the use by an organization. The image processing apparatus 100 according to the present exemplary embodiment distinguishes between the use by an organization and the use by an individual and performs different control of information management and operation. In the following description, the use by an organization is referred to as "organizational use", and the use by an individual is referred to as "personal use".

Configuration of Image Processing Apparatus 100

Figure 2:
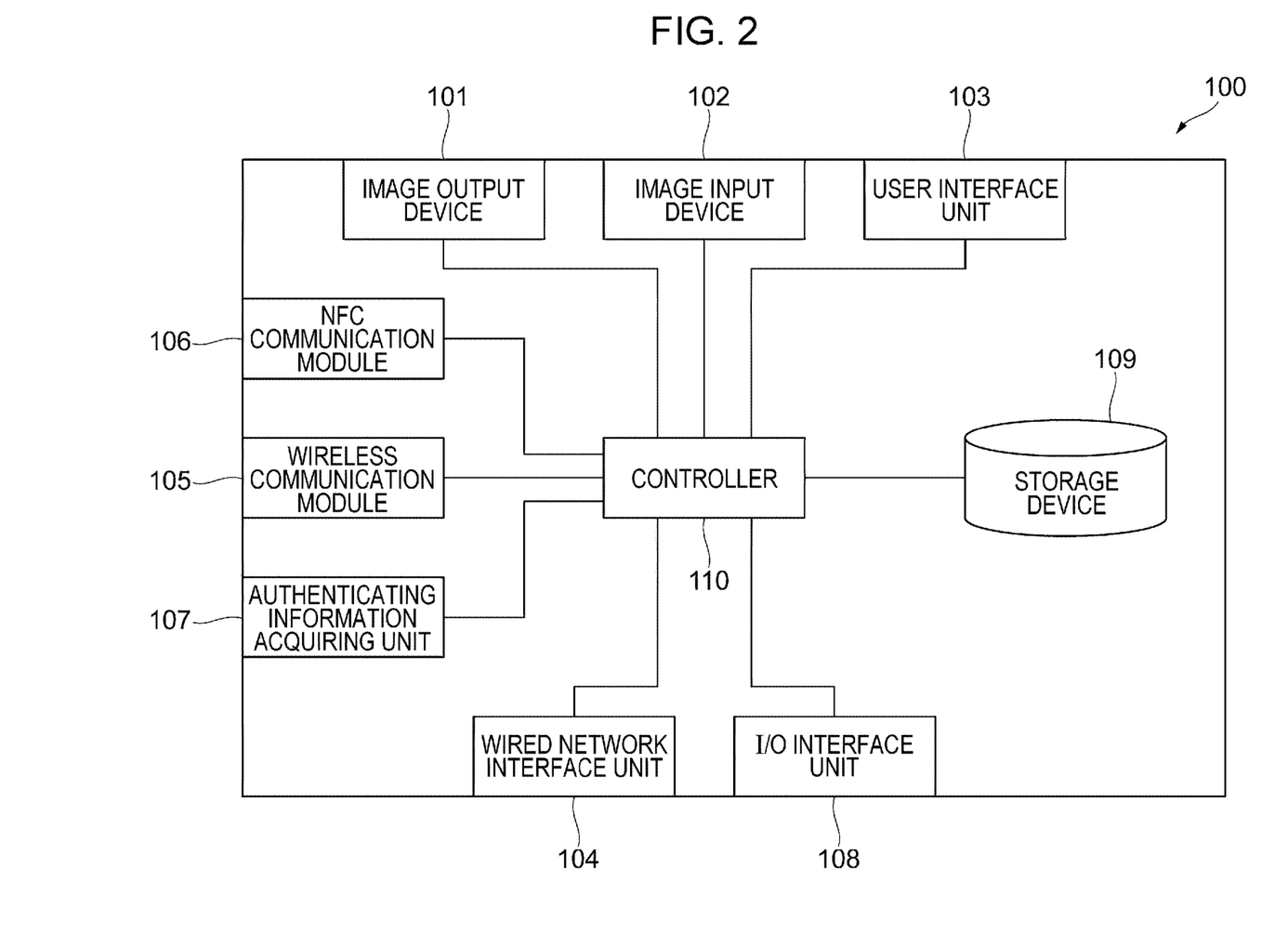
FIG. 2 is an illustration depicting a configuration of an image processing apparatus.

FIG. 2 is an illustration depicting a configuration of the image processing apparatus 100. The image processing apparatus 100 includes an image output device 101, an image input device 102, and a user interface (UI) unit 103. The image processing apparatus 100 also includes a wired network interface unit 104, a wireless communication module 105, an NFC communication module 106, an authenticating information acquiring unit 107, and an input/output (I/O) interface unit 108. In addition, the image processing apparatus 100 includes a storage device 109 and a controller 110.

The image output device 101 is an image output terminal (IOT). The image output device 101, which is constituted by a so-called printer device, uses an image forming material and forms images based on image data on a sheet of paper, which is an example of a recording medium. Examples of a method used for forming images on a recording medium include an electrophotographic system and an inkjet system. In the electrophotographic system, toner attached to a photosensitive member is transferred to a recording medium, and an image is formed. In the inkjet system, ink is discharged on a recording medium, and an image is formed. The image output device 101 is an example of an image forming unit.

The image input device 102 is an image input terminal (IIT). The image input device 102, which is constituted by a so-called scanner device, optically reads an image on a document that is set and generates a read image (image data). Examples of a method used for reading images include a charge coupled device (CCD) system and a contact image sensor (CIS) system. The CCD system uses a lens to reduce an optical image formed by light reflected by a document, which is irradiated by a light source, and uses CCDs to receive the reflected light. The CIS system uses a CIS to receive light reflected by a document, which is irradiated sequentially by a light emitting diode (LED) source.

The UI unit 103 includes a display unit and an input unit. The display unit displays screens such as an operation screen and an information presentation screen, and an operator performs an input operation on the input unit. An input operation is performed on the input unit in accordance with an operation screen displayed by the display unit, and various control commands and various kinds of control data are input. For example, a liquid crystal display is used as the display unit, and a hardware keyboard or a touch sensor is used as the input unit. Another example that may also be used is a touch panel, which is a combination of a liquid crystal display as the display unit and a touch sensor as the input unit.

The wired network interface unit 104 is used as a standard connection unit to connect an external apparatus to the image processing apparatus 100. For example, an Ethernet (registered trademark) network is used as the wired network 500 to which the wired network interface unit 104 is connected. As a general rule, the wired network interface unit 104 can always be used (can exchange data with an external apparatus connected to the image processing apparatus 100) while the image processing apparatus 100 is in operation. The use of the image processing apparatus 100 (process execution by the image output device 101 or by the image input device 102) via communication by using the wired network interface unit 104 is classified as organizational use. The wired network interface unit 104 is an example of a first communication interface.

The wireless communication module 105 performs wireless communication to connect the image processing apparatus 100 to external apparatuses. For example, when a wireless LAN such as a Wi-Fi network is used as a method of wireless communication, the wireless communication module 105 functions as a base station (access point). Thus, the image processing apparatus 100 can be directly connected to an external apparatus via wireless communication such as Wi-Fi Direct. The wireless communication module 105 is a connection unit mostly used to connect the special terminal apparatus 210 to the image processing apparatus 100. While the image processing apparatus 100 is in operation, the wireless communication module 105 is not in operation in the beginning and becomes available if a predetermined requirement is satisfied. As a general rule, the use of the image processing apparatus 100 via the wireless communication module 105 is classified as personal use. The requirement for making the wireless communication module 105 available will be described below. The wireless communication module 105 is an example of a second communication interface.

The NFC communication module 106 has a function of communication via NFC. The NFC communication module 106 configures connection settings of an external apparatus to connect to the image processing apparatus 100 via the wireless communication module 105. In a specific operation, for example, holding an external apparatus having a function of communication via NFC in front of the NFC communication module 106 (placing an external apparatus within the reach of an electromagnetic wave for NFC) starts communication via NFC, and the connection settings described above are configured. Similarly to the wireless communication module 105, the NFC communication module 106 may be configured to become available if a predetermined requirement is satisfied.

The authenticating information acquiring unit 107 acquires authenticating information to be used for authentication to allow a user to use the image processing apparatus 100. The authenticating information acquiring unit 107 is realized, for example, as a device for reading data from the authenticating device 220 such as an identity (ID) card that records authenticating information of a user. When data is read from an ID card to acquire authenticating information, NFC can be used to read data from the ID card. In such a case, the NFC communication module 106 may be configured to serve also as the authenticating information acquiring unit 107.

The I/O interface unit 108 is a connection unit used to connect an external apparatus to the image processing apparatus 100. The I/O interface unit 108 is configured to be a dedicated interface to connect the charging device 310 to the image processing apparatus 100.

The storage device 109 stores various kinds of data and programs. Specifically, the storage device 109 stores data containing an image or the like to be processed, operation history data of the image output device 101 and the image input device 102, programs to control the operation of the image processing apparatus 100, and the like. A nonvolatile storage unit is used as the storage device 109. Examples used as a nonvolatile storage unit include a magnetic disk device and a solid state drive (SSD).

The controller 110 controls the operation and the state of the image processing apparatus 100. The controller 110 includes a central processing unit (CPU), which is a calculating unit, and a main storage device (main memory), which is a storage unit. The CPU loads programs stored in the storage device 109 into the main storage device and executes the programs. For example, a random-access memory (RAM) is used as the main storage device. Alternatively, a read-only memory (ROM) that has stored the programs in advance may be disposed, and the CPU may load the programs directly from the ROM. The CPU loads and executes the programs, and various functions described below are realized. In this way, various kinds of control and processing are performed by the image processing apparatus 100.

Functional Configuration of Controller

Figure 3:
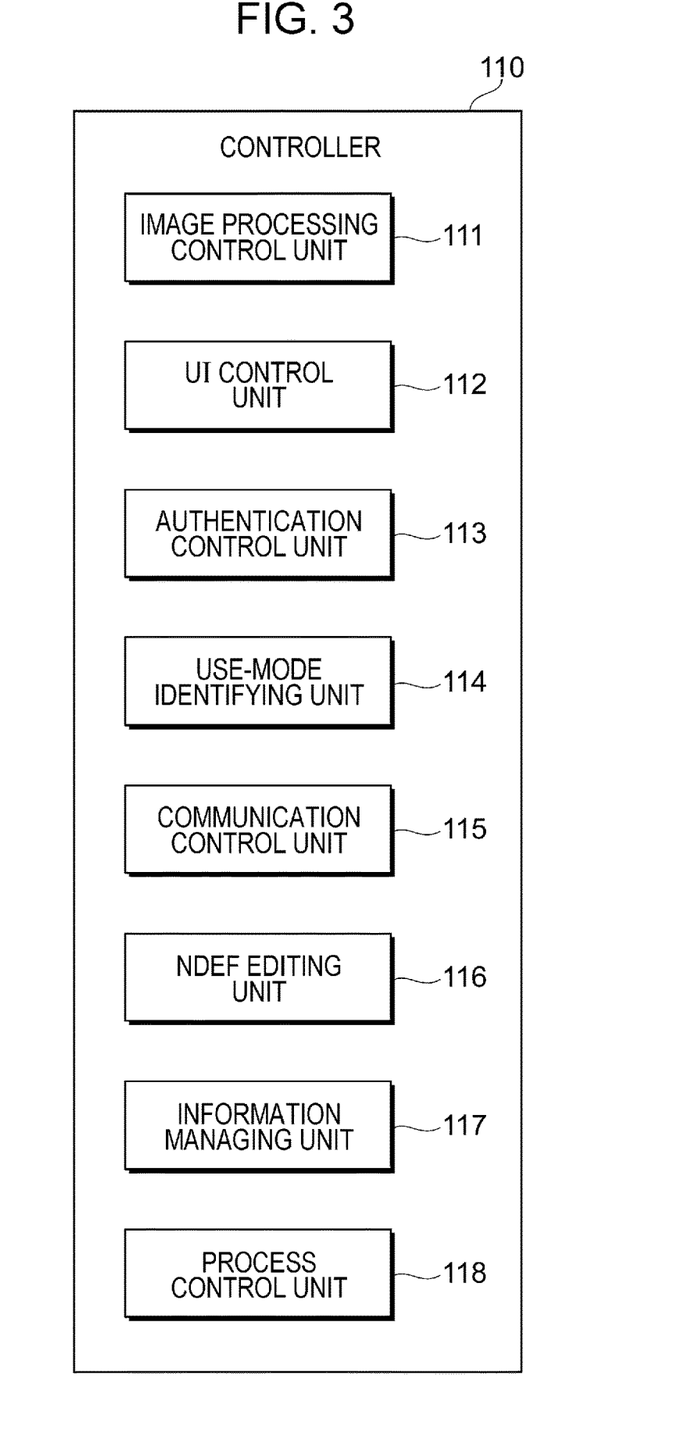
FIG. 3 is an illustration depicting a functional configuration of a controller.

FIG. 3 is an illustration depicting a functional configuration of the controller 110. The controller 110 includes an image processing control unit 111, a UI control unit 112, an authentication control unit 113, a use-mode identifying unit 114, a communication control unit 115, an NFC data exchange format (NDEF) editing unit 116, an information managing unit 117, and a process control unit 118.

The image processing control unit 111 controls the operations of the image output device 101 and the image input device 102. After causing the image output device 101 or the image input device 102 to perform a process, the image processing control unit 111 acquires history information concerning the performed process and sends the history information to the information managing unit 117.

The UI control unit 112 controls the display unit of the UI unit 103 and causes the display unit to display screens such as an operation screen and an information presentation screen. The UI control unit 112 also accepts an input operation performed by a user by using the input unit of the UI unit 103. Examples of a screen that the UI control unit 112 causes the UI unit 103 to display include a fee presentation screen that presents a fee charged for a process performed by the image output device 101 or by the image input device 102. Then, the UI control unit 112 accepts an operation of approval for the presented fee, the approval being provided by a user by using the UI unit 103. Thus, the UI control unit 112 and the UI unit 103 are examples of a presentation unit and an approval unit.

The authentication control unit 113 controls user authentication based on authenticating information acquired by the authenticating information acquiring unit 107. The authentication control unit 113 is connected to the authenticating server 410 via the wired network interface unit 104 and the wired network 500. The authentication control unit 113 transmits acquired authenticating information to the authenticating server 410 and acquires an authentication result from the authenticating server 410. Namely, an authentication process itself is performed by the authenticating server 410, and the authentication control unit 113 controls the operation after the authenticating information is acquired and until the authentication result is acquired. Specific relationships between user authentication and functions will be described below. The authentication control unit 113 and the authenticating information acquiring unit 107 are examples of an authenticating unit.

The use-mode identifying unit 114 identifies whether the use mode of the image processing apparatus 100 is classified as organizational use or as personal use. The use mode is identified in accordance with whether an operation performed when the image processing apparatus 100 is used satisfies a specific requirement. The requirement for identifying the use mode will be described below. In accordance with the identified use mode, the operation relating to the use of the image processing apparatus 100 (hereinafter, referred to as "relating operation") is switched.

The communication control unit 115 controls the wired network interface unit 104, the wireless communication module 105, and the NFC communication module 106 and controls communication with an external apparatus via each connection unit. The communication control unit 115 controls the wired network interface unit 104 so that the wired network interface unit 104 is always available while the image processing apparatus 100 is in operation. In addition, the communication control unit 115 controls the wireless communication module 105 and the NFC communication module 106 so that the wireless communication, module 105 and the NFC communication module 106 are normally unavailable and become available if a predetermined requirement is satisfied.

The NDEF editing unit 116 uses the NDEF and edits data when data is exchanged with an external apparatus via the NFC communication module 106. In the present exemplary embodiment, communication via the NFC communication module 106 is used to configure connection settings of an external apparatus to connect to the image processing apparatus 100 via the wireless communication module 105. In the communication for configuring connection settings, the NDEF editing unit 116 describes setting information for the connection via the wireless communication module 105 by using the NDEF. The NDEF editing unit 116 updates setting information (NDEF data for connection settings) every time connection settings are configured for the connection between the wireless communication module 105 and an external apparatus.

The information managing unit 117 manages history information acquired by the image processing control unit 111 and the result of user authentication performed by the authentication control unit 113 (hereinafter, referred to as authentication result information). The information managing unit 117 distinguishes between information generated by organizational use and information generated by personal use in accordance with the use mode identified by the use-mode identifying unit 114 and manages history information and authentication result information. The information managed by the information managing unit 117 is stored and retained, for example, in the storage device 109. The information managing unit 117 is an example of a managing unit.

The process control unit 118 centrally controls functions of the controller 110. The process control unit 118 also controls relating operations that accompany personal use of the image processing apparatus 100. Examples of the relating operations include a charging process. Specifically, the charging process includes a calculation of a fee charged for an executed process, presentation of a calculated fee, and acceptance of approval for charging.

The charging process as one of the relating operations will further e described herein. In the present exemplary embodiment, different charging schemes are adopted for organizational use and for personal use, and thus personal use of the image processing apparatus 100 is allowed. For this purpose, it is determined that the information managing unit 117 manages information such as history information separately for organizational use and for personal use. In particular, for personal use, the information managing unit 117 uses authenticating information and manages information such as history information for each user who has used the image processing apparatus 100. In this way, a usage record of personal use of the image processing apparatus 100 is identified for each user. Then, a usage fee is individually charged in accordance with the usage record for each user.

When a fee to be charged for personal use is processed, the process control unit 118 first calculates a fee to be charged in accordance with the specifics of a process performed by the image output device 101 or by the image input device 102 as the use of the image processing apparatus 100. Then, the process control unit 118 controls the UI control unit 112 so that the UI control unit 112 causes the UI unit 103 to present the calculated fee to be charged. An operation unit (for example, an approval button) that accepts an operation of approval by a user is displayed on the fee presentation screen, which displays a fee to be charged. If a user performs an operation of approval, the process control unit 118 accepts an execution instruction to perform a process for personal use. Examples of a method of collecting a fee charged for approved personal use include electronic settlement. The information relating to the charged fee is added to the information relating to personal use managed for each user by the information managing unit 117, and electronic settlement is performed in accordance with the information relating to personal use. Alternatively, a fee may be directly collected by using the charging device 310. In such a case, in addition to accepting an operation of approval, the process control unit 118 accepts an execution instruction on condition that the amount of money equal to a charged fee has been inserted into the charging device 310.

When a fee is charged by using the charging device 310, the display or the like of the operation unit of the UI unit 103 may be omitted. Instead, inserting a fee into the charging device 310 may be accepted as an operation of approval. For organizational use, since charging for the use of the image processing apparatus 100 is handled by each organization, each user who uses the image processing apparatus 100 is not subject to a charging process.

External Apparatus

The special terminal apparatus 210 depicted in FIG. 1 is a terminal apparatus used by a user who uses the image processing apparatus 100 in the personal-use mode. When in use, the special terminal apparatus 210 is connected to the image processing apparatus 100. The special terminal apparatus 210 includes a wireless communication function and a communication function via NFC (hereinafter, referred to as an NFC communication function). The wireless communication function is used to wirelessly connect to the wireless communication, module 105 to perform data exchange. The special terminal apparatus 210 receives setting information by using the NFC communication function and configures the settings for connection to the wireless communication module 105. Then, the special terminal apparatus 210 wirelessly communicates with the wireless communication module 105 and transmits various data such as execution commands to perform a process by using the image output device 101 or by using the image input device 102, information relating to process settings, and images to be processed. Examples of the special terminal apparatus 210 include an information device personally owned by a user. Specifically, for example, information devices such as a personal computer and a smartphone can be used as the special terminal apparatus 210.

The authenticating device 220 is a device that records authenticating information of a user. The authenticating device 220 records the authenticating information so that the authenticating information acquiring unit 107 can read the authenticating information. Examples to be used as the authenticating device 220 may include a smart card that records the authenticating information as electronic data.

The charging device 310 is a device for charging a fee for the use of the image processing apparatus 100. The charging device 310 is connected to the I/O interface unit 108 and accepts a fee charged for personal use or the like of the image processing apparatus 100. Fees to be charged are determined in advance in accordance with the specifics of operations of the image processing apparatus 100. Then, when the amount of money equal to a charged fee is inserted into the charging device 310, the charging device 310 transmits to the image processing apparatus 100 information that the fee has been paid. The completion of payment of the amount of money equal to the charged fee is required for the image processing apparatus 100 to perform the operation for which the fee is charged.

The authenticating server 410 performs authentication processes for users who use the image processing apparatus 100. The authenticating server 410 registers and retains authenticating information of users who are affiliated with an organization and who are authorized to use the image processing apparatus 100 in the organizational-use mode. The authenticating server 410 is connected to the image processing apparatus 100 via the wired network interface unit 104. The authenticating server 410 receives authenticating information from the image processing apparatus 100, determines whether the user identified by the received authenticating information is a legitimate user, and transmits the result of determination (authentication result) to the image processing apparatus 100. A legitimate user is defined as a user who is affiliated with an organization and is authorized to use the image processing apparatus 100 in the organizational-use mode and whose authenticating information is registered in the authenticating server 410.

The personal computer 420 is a terminal apparatus used by a user who uses the image processing apparatus 100 in the organizational-use mode. When in use, the personal computer 420 is connected to the image processing apparatus 100. The personal computer 420 is connected to the image processing apparatus 100 via the wired network 500 connected to the wired network interface unit 104. The personal computer 420 performs communication via the wired network 500 and transmits various data such as execution commands to perform a process by using the image output device 101 or by using the image input device 102, information relating to process settings, and images to be processed.

The wireless base station 430 is used to wirelessly connect an information device using the image processing apparatus 100 in the organizational-use mode to the image processing apparatus 100. The wireless base station 430 is connected to the image processing apparatus 100 via the wired network 500 connected to the wired network interface unit 104. Accordingly, an information device (such as a personal computer 420) wirelessly connected to the wireless base station 430 is treated as an external apparatus connected to the image processing apparatus 100 via the wired network 500.

Requirement for Personal Use of Image Processing Apparatus

When the image processing apparatus 100 is used in the personal-use mode, processes are performed by the image output device 101 or by the image input device 102 in accordance with an execution instruction received from an external apparatus via the wireless communication module 105, which is a second communication interface, the execution instruction being received after a predetermined requirement (hereinafter, referred to as a requirement for use) is satisfied. While the image processing apparatus 100 is in operation, the wireless communication module 105 is not in operation in the beginning. It is determined that the wireless communication module 105 becomes available if a predetermined requirement (hereinafter, referred to as a requirement for operation) is satisfied. Accordingly, a requirement for operation and a requirement for use both need to be satisfied to use the image processing apparatus 100 in the personal-use mode.

Various settings are possible for a requirement for operation and a requirement for use. The specifics of each requirement may be determined in accordance with, for example, the specification of the image processing apparatus 100 and the operation policy of an organization. Generally, the use of the image processing apparatus 100 is restricted to organizational use by default, and personal use is allowed only in special cases. In such a case, performing some operation that explicitly indicates personal use may be required. In the following description, specific examples of the requirement for operation and the requirement for use will be described for personal use.

First Specific Example

In the first specific example, the requirement for operation is assumed to be that user authentication is accomplished, and the requirement for use is assumed to be that connection settings for wireless communication are configured by using NFC communication. Specifically, the wireless communication module 105 and the NFC communication module 106 start operating once the authentication control unit 113 of the image processing apparatus 100 and the authenticating server 410 accomplish user authentication. Then, after the connection settings of the special terminal apparatus 210 for wireless communication, are configured by using NFC communication via the NFC communication module 106, the image processing apparatus 100 can be used in the personal-use mode. Under this condition, if the image processing apparatus 100 and the special terminal apparatus 210 are wirelessly connected to each other by using the wireless communication module 105, the use-mode identifying unit 114 identifies an execution instruction wirelessly received from the special terminal apparatus 210 as due to personal use.

After a process for personal use has been performed by using the image output device 101 or by using the image input device 102, the information managing unit 117 acquires history information relating to the performed process from the image processing control unit 111. Then, the information managing unit 117 handles the history information relating to the performed process separately from history information relating to processes for organizational use and manages the history information relating to the performed process for each user who has used the image processing apparatus 100 in the personal-use mode. In addition, the process control unit 118 performs a relating operation such as a charging process.

Second Specific Example

In the second specific example, the requirement for operation is assumed to be that user authentication is accomplished, and the requirement for use is assumed to be that an operation for switching to personal use is performed. An operation for switching to personal use is defined as an operation explicitly performed by a user, and the operation switches the use mode of the image processing apparatus 100 from organizational use to personal use. For example, a button for switching the use mode may be displayed by the display unit of the UI unit 103. When a user touches the button for switching the use mode, the use mode of the image processing apparatus 100 may be switched from organizational use to personal use. An operation for switching to personal use is not limited to the operation of the button for switching the use mode described above, and various operations intentionally and explicitly performed by a user may be adopted.

In the second specific example, the wireless communication module 105 and the NFC communication module 106 start operating once the authentication control unit 113 of the image processing apparatus 100 and the authenticating server 410 accomplish user authentication. Then, after the operation for switching to personal use is performed, the image processing apparatus 100 can be used in the personal-use mode. Under this condition, if the image processing apparatus 100 and the special terminal apparatus 210 are wirelessly connected to each other by using the wireless communication module 105, the use-mode identifying unit 114 identifies an execution instruction wirelessly received from the special terminal apparatus 210 as due to personal use. Accordingly, the information managing unit 117 acquires history information relating to the performed process from the image processing control unit 111. Then, the information managing unit 117 handles the history information relating to the performed process separately from history information relating to processes for organizational use and manages the history information relating to the performed process for each user who has used the image processing apparatus 100 in the personal-use mode. In addition, the process control unit 118 performs a relating operation such as a charging process.

In the second specific example, as described above, the operation for switching to personal use is performed, and the image processing apparatus 100 can be used in the personal-use mode. In other words, even after user authentication is accomplished and the wireless communication module 105 and the NFC communication module 106 start operating, the image processing apparatus 100 is not available for personal use unless the operation for switching to personal use is performed. Accordingly, an execution instruction t the image processing apparatus 100, the execution instruction being wirelessly received via the wireless communication module 105 without performing the operation for switching to personal use, is identified as due to organizational use by the use-mode identifying unit 114. Namely, connecting a terminal apparatus to the image processing apparatus 100 without performing the operation for switching to personal use allows a wirelessly received execution instruction to cause the image processing apparatus 100 to perform a process for organizational use. If an operation performed by using NFC communication to configure the connection settings for wireless communication is regarded as one kind of the operation for switching to personal use, the first specific example described above is included in the second specific example.

Third Specific Example

In the third specific example, the requirement for operation is assumed to be that user authentication is accomplished, and the requirement for use is assumed to be that an external apparatus having no identifying information that is registered in advance is wirelessly connected to the image processing apparatus 100 via the wireless communication module 105. The identifying information is information for identifying a terminal apparatus to be connected to the image processing apparatus 100. For example, the ID information of a terminal apparatus, such as a personal computer 420, used for organizational use is registered in advance in the information managing unit 117 of the image processing apparatus 100. In contrast, the ID information of the special terminal apparatus 210 owned by an individual is not registered.

In the third specific example, the wireless communication module 105 and the NFC communication module 106 start operating once the authentication control unit 113 of the image processing apparatus 100 and the authenticating server 410 accomplish user authentication. If an execution instruction wirelessly received via the wireless communication module 105 is transmitted from a terminal apparatus having registered ID information, the use-mode identifying unit 114 identifies the received execution instruction as due to organizational use. In contrast, if an execution instruction wirelessly received via the wireless communication module 105 is transmitted from a terminal apparatus having ID information that is not registered (having no registered ID information), the use-mode identifying unit 114 identifies the received execution instruction as due to personal use. Accordingly, the information managing unit 117 acquires history information relating to the performed process from the image processing control unit 111. Then, the information managing unit 117 handles the history information relating to the performed process separately from history information relating to processes for organizational use and manages the history information relating to the performed process for each user who has used the image processing apparatus 100 in the personal-use mode. In addition, the process control unit 118 performs a relating operation such as a charging process.

Fourth Specific Example

In the fourth specific example, the requirement for operation and the requirement for use are both assumed to be that user authentication is accomplished. Specifically, the wireless communication module 105 and the NFC communication module 106 start operating and become available for personal use once the authentication control unit 113 of the image processing apparatus 100 and the authenticating server 410 accomplish user authentication. Under this condition, if the image processing apparatus 100 and the special terminal apparatus 210 are wirelessly connected to each other by using the wireless communication module 105, the use-mode identifying unit 114 identifies an execution instruction wirelessly received from the special terminal apparatus 210 as due to personal use. Accordingly, the information managing unit 117 acquires history information relating to the performed process from the image processing control unit 111. Then, the information managing unit 117 handles the history information relating to the performed process separately from history information relating to processes for organizational use and manages the history information relating to the performed process for each user who has used the image processing apparatus 100 in the personal-use mode. In addition, the process control unit 118 performs a relating operation such as a charging process.

Fifth Specific Example

In the fifth specific example, the requirement for operation and the requirement for use are both assumed to be that an operation for switching to personal use is performed. Specifically, the wireless communication module 105 and the NFC communication module 106, which do not need user authentication, start operating and become available for personal use once the operation for switching to personal use is performed. Under this condition, if the image processing apparatus 100 and the special terminal apparatus 210 are wirelessly connected to each other by using the wireless communication module 105, the use-mode identifying unit 114 identifies an execution instruction wirelessly received from the special terminal apparatus 210 as due to personal use. Accordingly, the information managing unit 117 acquires history information relating to the performed process from the image processing control unit 111. Then, the information managing unit 117 manages the history information relating to the performed process separately from history information relating to processes for organizational use.

Figure 4:
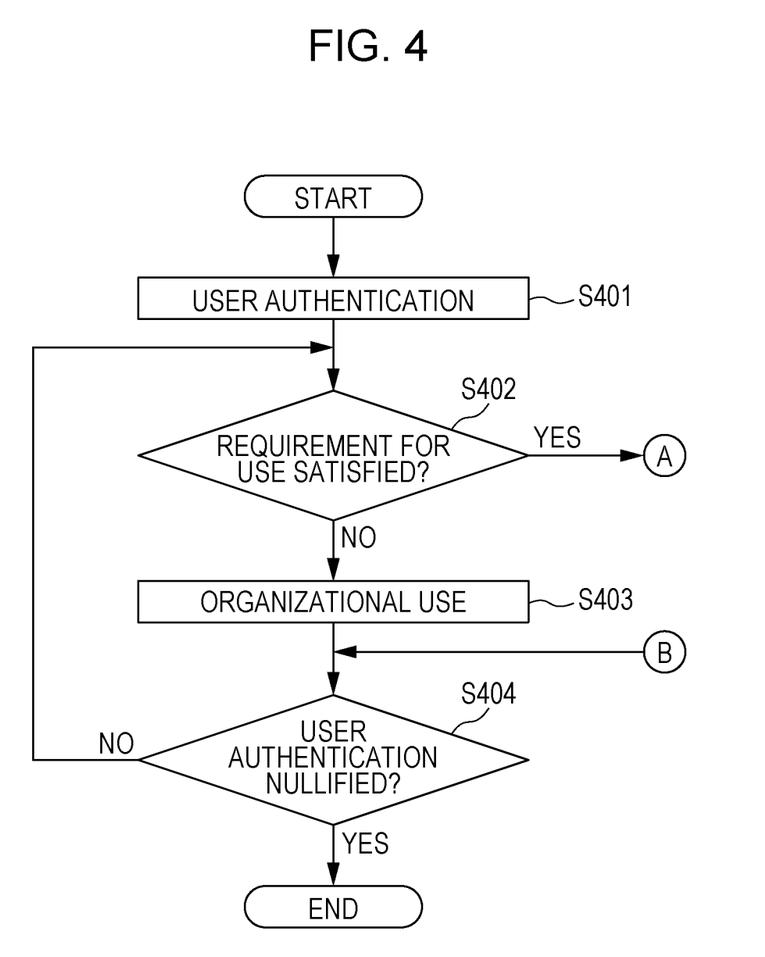
FIG. 4 is a flowchart depicting the operation flow of the image processing apparatus.
Figure 5:
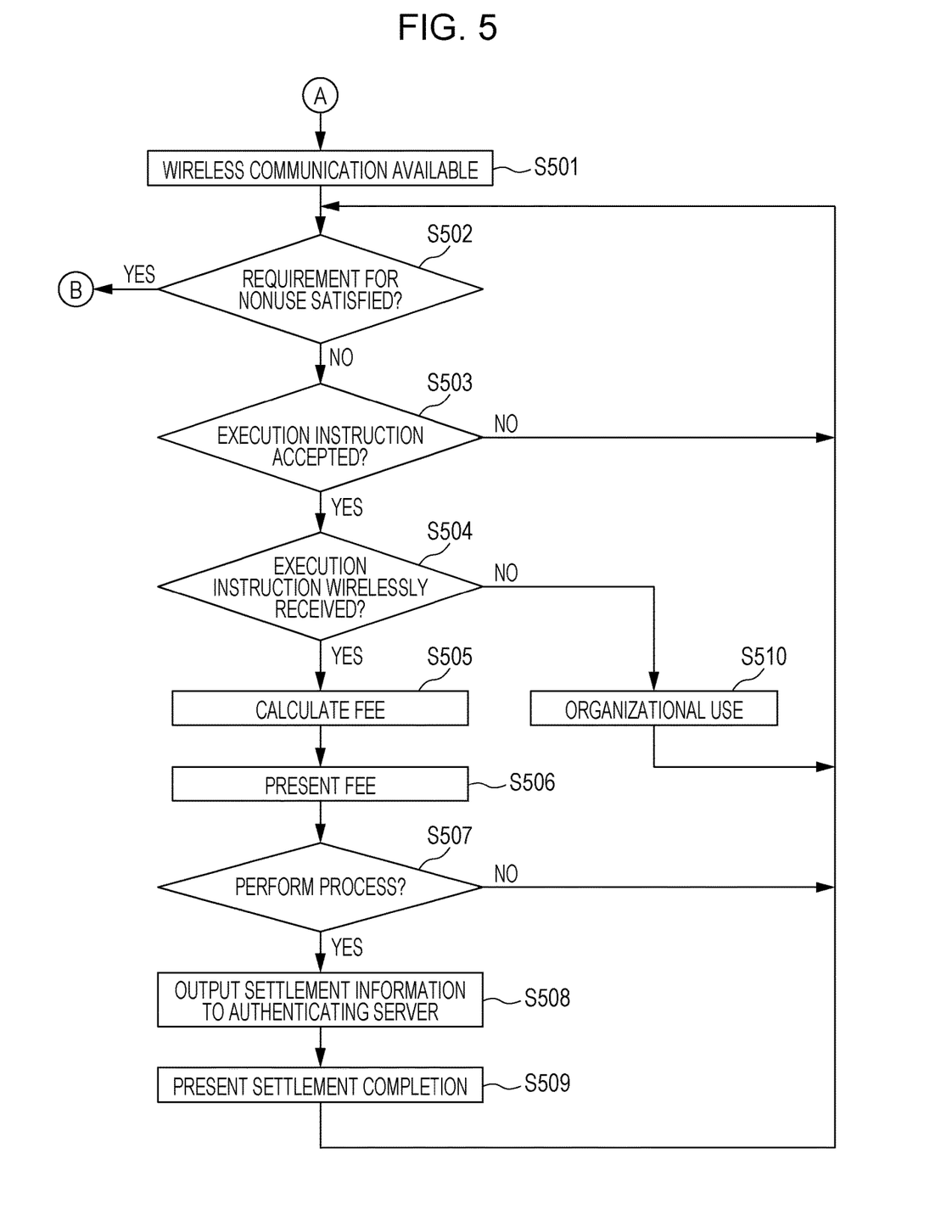
FIG. 5 is a flowchart depicting the operation flow of the image processing apparatus.

In the fifth specific example, the image processing apparatus 100 can be used without performing user authentication. In such a case, a user who has used the image processing apparatus 100 cannot be identified. Thus, when a fee is charged for personal use, the fee is not calculated in accordance with history information managed by the information managing unit 117, and the fee is charged by using the charging device 310 instead. When a user uses the image processing apparatus 100 in the personal-use mode, the user inserts a required fee into the charging device 310, and the image processing apparatus 100 becomes available for use, Operation Flow of image Processing Apparatus FIGS. 4 and 5 are flowcharts depicting the operation flow of the image processing apparatus 100. In the operation flow depicted in FIGS. 4 and 5, accomplishing user authentication is assumed to be the requirement for operation of the wireless communication module 105 and the NFC communication module 106. Charging for personal use is assumed to be performed by using electronic settlement.

Once a user who is going to use the image processing apparatus 100 accomplishes user authentication by using the authenticating device 220 (S401), the requirement for operation is satisfied, and the wireless communication module 105 and the NFC communication module 106 start operating. At this point, if the requirement for use is not satisfied (NO in S402), the use of the image processing apparatus 100 by this user is classified as organizational use (S403). Then, when the process relating to the use of the image processing apparatus 100 is finished and the user authentication is nullified (YES in S404), a series of operations of the image processing apparatus 100 finish. If the user authentication is not nullified and another process starts (NO in S404), the operation flow starting from 8402 is repeated. The user authentication may be nullified, for example, when a fixed amount of time has passed without the image processing apparatus 100 being used. Alternatively, the user authentication may be nullified upon receiving an explicit operation by the user.

In contrast, if the wireless communication module 105 and the NFC communication module 106 start operating and the requirement for use is satisfied (YES in S402), wireless communication via the wireless communication module 105 becomes available for transmitting to the image processing apparatus 100 execution instructions and the like to perform a process for personal use (S501 in FIG. 5). Next, the process control unit 118 of the image processing apparatus 100 determines whether a requirement for nonuse is satisfied (S502). The requirement for nonuse is a requirement for disallowing the use of the wireless communication module 105 to transmit execution instructions and the like to perform a process for personal use. Various examples of the requirement for nonuse are possible. For example, the requirement for nonuse may be satisfied when an explicit operation by a user is accepted. Alternatively, the requirement for nonuse may be satisfied when a fixed amount of time has passed without the image processing apparatus 100 being used.

If the requirement for nonuse is not satisfied (NO in S502) and an execution instruction is accepted within a fixed amount of time (YES in S503), and if the execution instruction is wirelessly received via the wireless communication module 105 (YES in S504), the use of the image processing apparatus 100 based on this execution instruction is classified as personal use. Accordingly, the process control unit 118 calculates the usage fee to be charged for the use of the image processing apparatus 100 (S505) and causes the UI unit 103 to present the fee (S506).

If the user performs an operation of approval for the presented fee, a process by the image output device 101 or the image input device 102 controlled by the image processing control unit 111 is performed in accordance with the execution instruction (YES in S507). Subsequently, the process control unit 118 generates settlement information relating to the use of the image processing apparatus 100, outputs the settlement information to the authenticating server 410 (S508), and causes the UI unit 103 to present settlement completion (S509).

If the user does not approve the presented fee and performs an operation to discard the execution instruction, no process based on the execution instruction is performed by the image output device 101 or by the image input device 102 (NO in S507). Then, the operation flow returns to the determination of whether the requirement for nonuse is satisfied (S502).

If the execution instruction accepted in S503 is not wirelessly received via the wireless communication module 105 (NO in S504), the use of the image processing apparatus 100 based on this execution instruction is classified as organizational use (S510). Then, the operation flow returns to the determination of whether the requirement for nonuse is satisfied (S502) after the process relating to the use of the image processing apparatus 100 finishes.

If the requirement for nonuse is not satisfied (NO in S502) and no execution instruction is accepted within a fixed amount of time (NO in S503), the operation flow returns to the determination of whether the requirement for nonuse is satisfied (S502). If the requirement for nonuse is satisfied (YES in S502), the operation flow returns to the determination of whether the user authentication is nullified (S404 in FIG. 4). If the requirement for nonuse (S502) is that a fixed amount of time has passed without the image processing apparatus 100 being used and this amount of time is equal to the period of waiting for an execution instruction to arrive (S503), the period of waiting for an execution instruction to arrive expires at the same time as the requirement for nonuse is satisfied. Further, if the requirement for the user authentication to be nullified (S404) is that a fixed amount of time has passed without the image processing apparatus 100 being used and this amount of time is equal to the amount of time to pass before the requirement for nonuse is satisfied (S502) and the period of waiting for an execution instruction to arrive (S503), the user authentication is also nullified at the same time, and a series of operations of the image processing apparatus 100 finish.

Operation Flow of Special Terminal Apparatus

Figure 6:
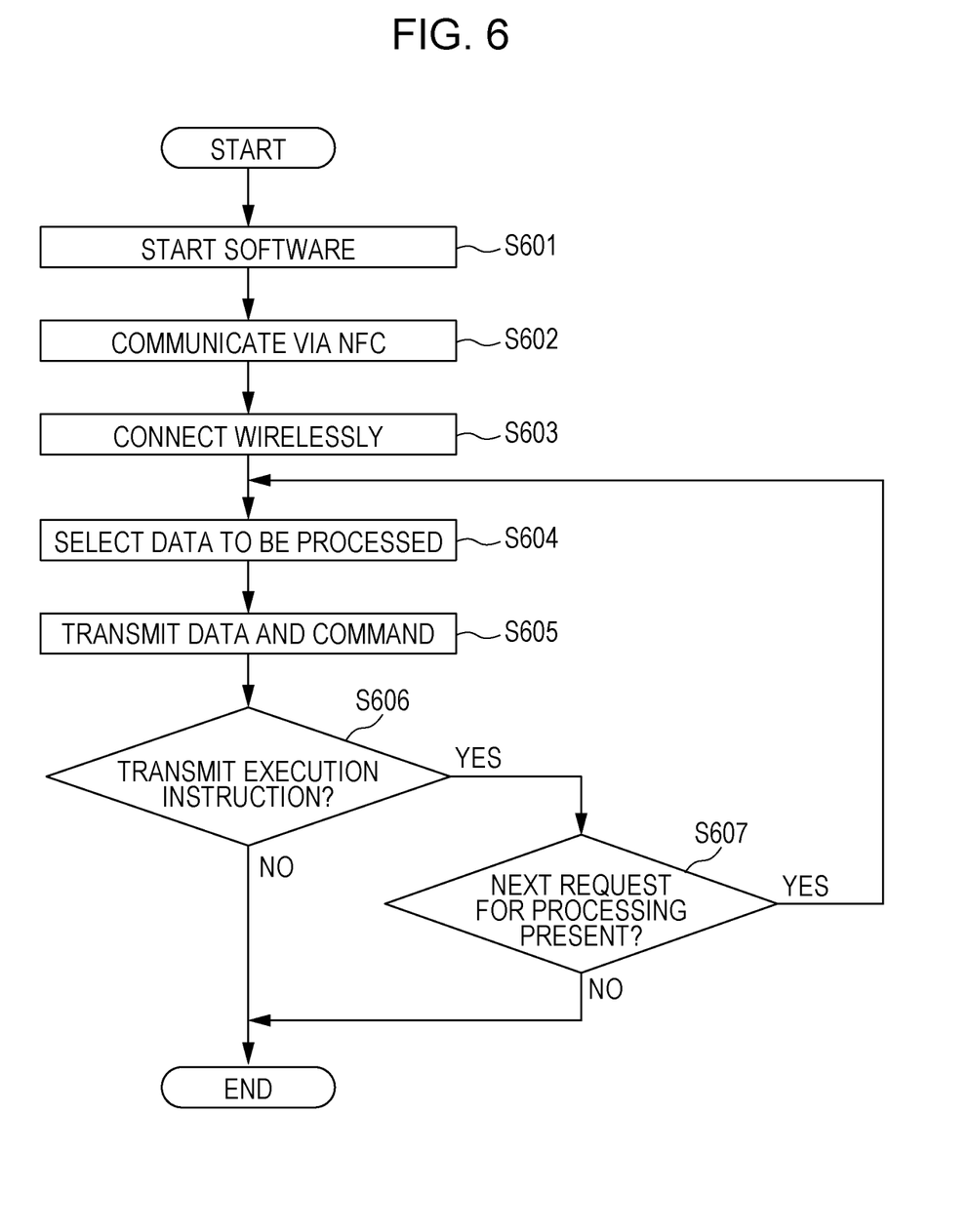
FIG. 6 is a flowchart depicting the operation flow of a special terminal apparatus.

FIG. 6 is a flowchart depicting the operation flow of the special terminal apparatus 210. The initial state of the image processing apparatus 100 is assumed to be that the requirement for operation has been satisfied and that the wireless communication module 105 and the NFC communication module 106 are operating. The image processing apparatus 100 is used in the personal-use mode when accessed from the special terminal apparatus 210.

First, a user starts software in the special terminal apparatus 210 to operate the image processing apparatus 100 (S601). Next, the user brings the special terminal apparatus 210 close to the NFC communication module 106 of the image processing apparatus 100 and causes the special terminal apparatus 210 and the NFC communication module 106 to communicate with each other via NFC (602). In this way, the special terminal apparatus 210 receives from the image processing apparatus 100 the information regarding connection to the wireless communication module 105 and configures connection settings. Then, the special terminal apparatus 210 is connected to the wireless communication module 105 by using the connection settings (S603).

Next, the user uses the special terminal apparatus 210 in which the software started in S601 is in operation and selects data that the user intends the image processing apparatus 100 to process (data to be processed) (S604). Then, the user operates the special terminal apparatus 210 in which the software is in operation and causes the special terminal apparatus 210 to transmit to the image processing apparatus 100 the selected data to be processed and an execution command to process the selected data (S605).

The user refers to a fee presentation screen displayed by the UI unit 103 of the image processing apparatus 100. If the user intends to perform the process, the user operates and causes the special terminal apparatus 210 to transmit an execution instruction to the image processing apparatus 100 (YES in S606). If a further process to be performed is present (YES in S607), the operation flow returns to the selection of data to be processed (S604). If no further process to be performed is present (NO in S607), the special terminal apparatus 210 terminates the process. If the user decides not to perform the process after referring to the fee presentation screen displayed by the UI unit 103 of the image processing apparatus 100, the user discards the execution instruction to perform the process (NO in S606). Discarding the execution instruction causes the special terminal apparatus 210 to terminate the process.

The exemplary embodiment of the present disclosure has been described as above, but the technical scope of the present disclosure is not limited to the exemplary embodiment described above. For example, in the exemplary embodiment described above, it is assumed that a user who uses the image processing apparatus 100 in the personal-use mode is charged for use. However, to allow the personal use of the image processing apparatus 100, which is a resource of an organization, it is sufficient to at least manage organizational use and personal use separately. Thus, an organization may adopt a practice in which a fee is also charged for organizational use or no fee is charged for personal use. In addition, if all the charging process is performed by using electronic settlement, the charging device 310 need not be connected to the image processing apparatus 100. Furthermore, various modifications and alterations to the configuration that do not depart from the technical scope of the present disclosure are included in the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
    a first communication interface configured to communicate with a first external apparatus;
    a second communication interface that differs from the first communication interface and that is configured to connect to a second external apparatus when a predetermined requirement for operation is satisfied;
    a printer device configured to form an image on a medium in accordance with a first execution instruction received from the first external apparatus via the first communication interface or a second execution instruction received from the second external apparatus via the second communication interface, and
    a processor configured to:
        authenticate a user, and
        handle a first kind of process performed by the printer device separately from a second kind of process performed by the printer device, and
        manage information relating to an obtained user authentication result and information relating to a process performed in accordance with the first execution instruction or the second execution instruction, wherein:
    the first kind of process is performed by the printer device in accordance with the second execution instruction, the second execution instruction being received after a predetermined requirement for use is satisfied, and
    the second kind of process is performed by the printer device in accordance with the first execution instruction, the first execution instruction being received without satisfying the predetermined requirement for use.

2. The image processing apparatus according to claim 1, wherein the predetermined requirement for operation is that the user is authenticated by the processor.

3. The image processing apparatus according to claim 2, wherein the predetermined requirement for use is that an operation is performed on a user interface display.

4. The image processing apparatus according to claim 2, wherein the predetermined requirement for use is that the second external apparatus has no identifying information that is registered in advance.

5. The image processing apparatus according to claim 2, wherein the predetermined requirement for use is that the user is authenticated by the processor.

6. The image processing apparatus according to claim 1, wherein the processor is further configured to calculate a fee charged for the process in accordance with the second execution instruction when the predetermined requirement for use is satisfied.

7. The image processing apparatus according to claim 6, further comprising:
    a user interface display that presents the fee calculated by the processor.

8. The image processing apparatus according to claim 7, wherein the processor is further configured to accept an operation of approval by the user when the fee is presented by the user interface display, and
    when the operation of approval is accepted by the processor, the printer device performs the process when the predetermined requirement for use is satisfied.

9. The image processing apparatus according to claim 1, wherein:
    the processor is further configured to:
        identify a use mode of the image processing apparatus as classified for personal use when the process is the first kind of process, and
        identify the use mode of the image processing apparatus as classified for organizational use when the process is the second kind of process.

10. A non-transitory computer readable medium storing a program that, when executed, causes a computer to execute a process for image processing, the computer including a first communication interface for communication with a first external apparatus, a second communication interface for communication with a second external apparatus, and a processor, the process comprising:
    authenticating a user;
    controlling and enabling the first communication interface to communicate with the first external apparatus;

controlling and enabling the second communication interface to connect to the second external apparatus when a predetermined requirement for operation is satisfied;

receiving a first execution instruction received from the first external apparatus via the first communication interface or a second execution instruction received from the second external apparatus via the second communication interface;

handling a first kind of process which is separate from a second kind of process; and managing information relating to an obtained user authentication result and information relating to a process performed in accordance with the first execution instruction or the second execution instruction, wherein:

the first kind of process is performed in accordance with the second execution instruction, the second execution instruction being received after a predetermined requirement for use is satisfied, and the second kind of process is performed in accordance with the first execution instruction, the first execution instruction being received without satisfying the predetermined requirement for use.

11. An image processing apparatus comprising:

means for authenticating a user;

means for communicating with a first external apparatus by a first method;

means for enabling connection to a second external apparatus by a second method that differs from the first method when a predetermined requirement for operation is satisfied;

means for forming an image on a medium in accordance with a first execution instruction received from the first external apparatus by the first method or a second execution instruction received from the second external apparatus by the second method; and means for handling a first kind of image forming process separately from a second kind of image forming process, and means for managing information relating to a user authentication result obtained by the means for authenticating a user and information relating to a process performed in accordance with the first execution instruction or the second execution instruction, wherein:

the first kind of image forming process is performed by the means for forming an image in accordance with the second execution instruction, the second execution instruction being received after a predetermined requirement for use is satisfied, and the second kind of image forming process is performed by the means for forming an image in accordance with the first execution instruction, the first execution instruction being received without satisfying the predetermined requirement for use.

* * * * *